United States Patent [19]

Barbour et al.

[11] Patent Number: 4,735,510

[45] Date of Patent: Apr. 5, 1988

[54] WHISK STRUCTURE

[76] Inventors: William P. Barbour; Dorothy B. Barbour, both of 8021 Nicky Ct., Laurel, Md. 20707

[21] Appl. No.: 25,172

[22] Filed: Mar. 12, 1987

[51] Int. Cl.⁴ .............................................. B01F 13/00
[52] U.S. Cl. ..................................... 366/343; 15/141.1
[58] Field of Search ............... 366/343, 129, 342, 348, 366/349, 325, 326; 15/141 R

[56] References Cited

U.S. PATENT DOCUMENTS

| | | | |
|---|---|---|---|
| 1,287,741 | 12/1918 | Pinkney | 366/343 |
| 1,468,560 | 9/1923 | Diehl | 366/343 |
| 1,910,302 | 5/1933 | Maslow | 366/343 |
| 2,208,337 | 7/1940 | Maslow | 366/343 |
| 2,277,986 | 3/1942 | Karp | 366/343 |
| 3,412,983 | 11/1968 | Kesilman | 15/141 R |

*Primary Examiner*—Robert W. Jenkins
*Attorney, Agent, or Firm*—Cushman, Darby & Cushman

[57] ABSTRACT

A whisk structure includes an elongated handle and having a counterbore defined by an internal wall surface formed at a first radius and a plurality of first-diameter bores located along a second radius, the second radius exceeding the first radius by a dimension no larger than the radius of the first-diameter bores. The end portions of the whisking loops are each received within respective first-diameter bores with a securing disc received with the counterbore to forcibly retain the whisking loop end portions in their respective bores and a fastener means for maintaining the securing disc in the counterbore. One or more whisking loops may be removed by removing the circular retainer and removing one or more the whisk loops.

1 Claim, 2 Drawing Sheets

WHISK STRUCTURE

BACKGROUND OF THE INVENTION

The present invention relates to whisks and, more particularly, to an improved whisk structure for retaining whisking elements in a handle.

A whisk is a kitchen implement used for the hand beating of certain foodstuffs, such as eggs, cream, oils, potatoes, and the like, and is usually fabricated from a plurality of wire whisking loops that are retained in a handle that is oftentimes fabricated from helically wound wire. The whisk is grasped and moved in a closed, circular path to beat the foodstuffs. Where metal wire loops are used as the whisking elements, the whisk can have a long service life since the metal whisk loops rarely break or wear. However, with the introduction of fine porcelain cooking pots and bowls with aesthetically attractive glazed finishes and/or non-stick coatings, traditional metal whisks are less useful since the rubbing of the metal whisk loop against the interior of the bowl can cause surface scratches, crazing, or, in the case of ceramic bowls, can breakdown or otherwise destroy the glazed surface of the bowl. Likewise, metal whisking loops can destroy non-stick finishes and coatings. In addition to the damage to the interior of the bowl or pot, metal whisking loops can leave metal deposits or traces from the whisking element on the interior surface of the bowl or pot.

While plastic-coated whisk loops and non-metallic whisking loops have been used, for example, bamboo whisk elements, the plastic-coating can wear away in the case of the plastic-coated whisk loop and a non-metallic material, such as bamboo, is oftentimes less durable than a metal whisk loop because of a tendency to absorb moisture.

In general whisk loops are permanently formed to or otherwise molded to the whisk handle. In this situation, a broken whisk element requires that the entire whisk be discarded since a single whisk loop cannot be replaced.

SUMMARY OF THE INVENTION

In view of the above, it is an object of the present invention, among others, to provide a whisk having non-metal whisk loops that duplicates the whisking action of traditional metal whisk but without the risk of damaging the surface of a bowl or other foodstuffs container.

It is another object of the present invention to provide a whisk having stiff non-metal whisking loops that can be replaced in the event a whisk loop breaks.

It is another object of the present invention to releasably capture the whisking elements in a handle by a mechanical securing device which allows convenient removal and replacement of the whisk elements.

In view of these objects, and others, the present invention provides a whisk structure including an elongated handle and a plurality of whisking loops removably secured to one end of the handle by a securing fastener. The end of the handle includes a counterbore having an interior wall formed at a first radius and a plurality of whisk loop receiving bores angularly equi-spaced about a bore circle formed at a second radius, then second radius larger than the first radius by an amount no greater than the radius of the whisk loop receiving bores. A circular retainer is forced into the counterbore to forcibly retain the whisk ends in place in their respective bores with a threaded fastener releasably securing the retainer in place. One or more whisk loops may be removed by removing the circular retainer and effecting replacement.

Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
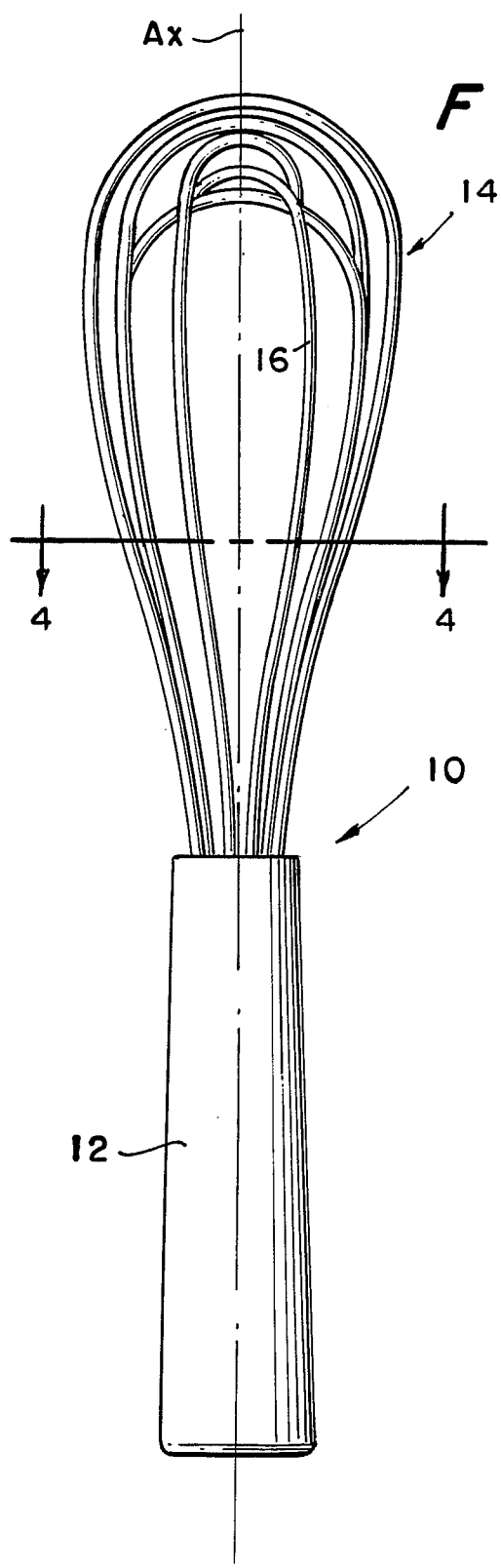
FIG. 1 is a side elevational view of a whisk in accordance with the present invention.
Figure 2:
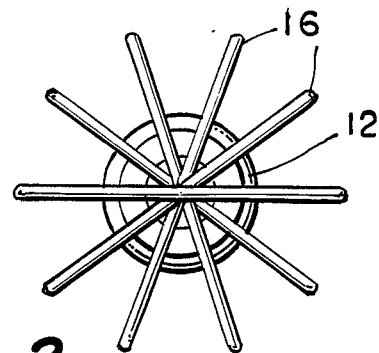
FIG. 2 is a first end view of the whisk of FIG. 1.
Figure 3:
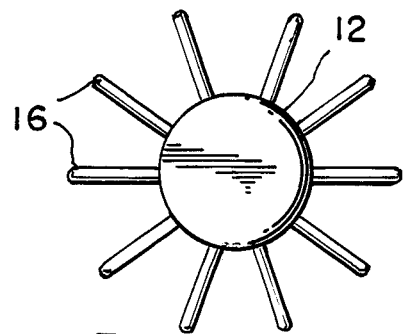
FIG. 3 is a second end view of the whisk of FIG. 1.

A whisk structure incorporating the present invention is illustrated in FIGS. 1, 2, and 3 and designated generally therein by the reference character 10. As shown, the whisk 10 includes a handle 12 and a whisking element group 14 defined by five individual whisking loops 16. The whisking loops 16 have differing lengths to allow each loop 16 to operate independently of the others. In the preferred embodiment, the handle 12 is molded as a tapered cone from a plastic or other suitable material about an axis $A_x$ and each of the whisking loops 16 is formed from selected lengths of acetal rod, a rod diameter of 0.093 to 0.125 inches being preferred. In general, the rod diameter should be sufficient to provide a stiff yet flexible whisking loop 16 for optimum performance.

Figure 4:
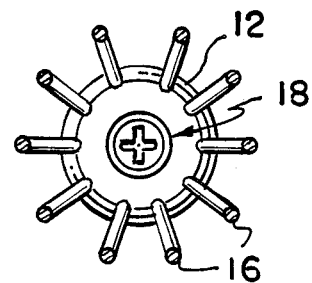
FIG. 4 is a cross sectional view of the whisk of FIG. 1 taken along line 4—4 of FIG. 1.
Figure 5:
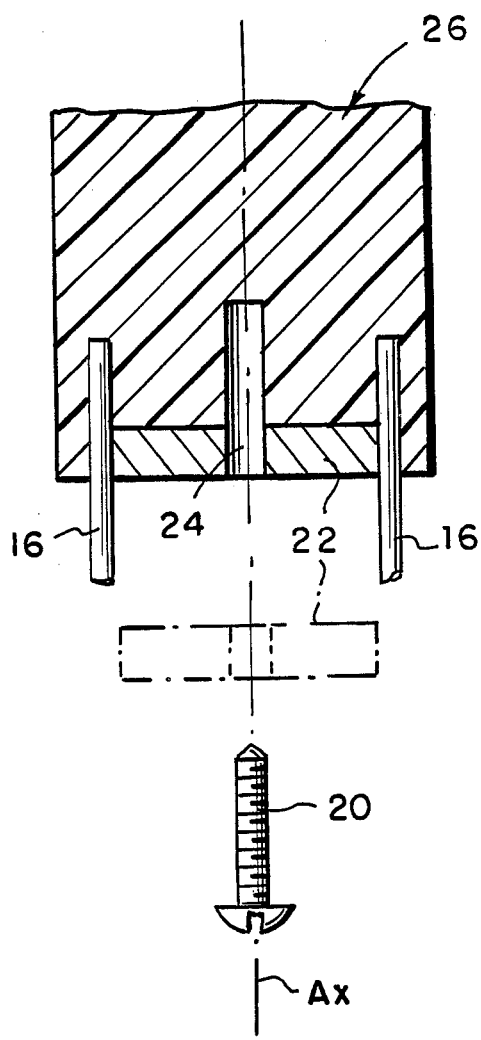
FIG. 5 is a partial cross section view of the whisk illustrating the manner by which the whisking elements are retained in place.
Figure 6:
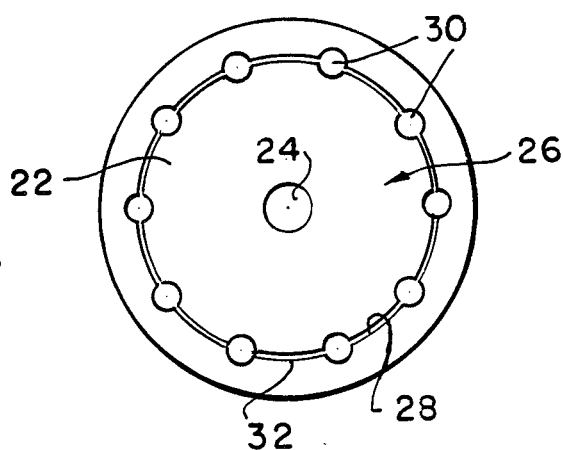
FIG. 6 is an end view of the handle portion of the whisk illustrating the hole pattern for receiving whisk loop ends.

As shown in FIG. 4, the various whisking loops 16 are removably secured to the narrow end of the handle 12 by a loop securing assembly 18 which, as shown in the detail of FIG. 5, includes a fastener 20 and an annular securing disc 22. As shown in the enlarged detail of FIG. 6, the narrow end of the handle 12 is provided with a central bore 24 for accepting the fastener 20 and a counterbore 26 that includes an inside diameter wall 28 formed at a preferred radius from the axis $A_x$. A plurality of whisk-end accepting bores 30 is preferably formed in parallel alignment with the axis $A_x$ of the central bore 24 and in equi-spaced angular distribution about the axis $A_x$ of the handle 12, a 36 degree angular spacing utilized in the case of the preferred embodiment. As shown in FIG. 4, the ends of the respective whisk loops 16 are received within respective bores 30 with the securing disc 22 forced into the counterbore 26 and held in place by the fastener 20. As shown in FIG. 6, the bores are formed on a circle 32 (only a portion of which is illustrated) having a radius somewhat larger than that of the internal wall 28 of the counterbore 26 so that selected portions of the inwardly facing surfaces of each whisk loop 16 protrude or extend into the counterbore 26. In general, the radius of the circle 32 upon which the bores 30 are located is greater than that of the internal wall 28 by an amount no greater than the radius of the bores 30. As the securing disc 22 is forced into the counterbore 26, the whisk loops ends are forcibly retained in place in a reliable and straight forward manner with the fastener 20 maintaining the securing disc 22 in place.

In order to remove the whisking loops 16 for replacement of a broken or worn loop, the fastener 20, which is preferably a threaded faster, and the securing disc 22 are removed. The whisking loops 16 can then be removed from the bores 30 and replacement whisking loops 16 installed using the securing disc 22 and the fastener 20.

The present invention advantageously provides a whisk structure in which the whisk elements are non-metal so as to protect decorative finishes and glazes and non-stick coatings on bowls and cooking pots and yet allows convenient removal and replacement of whisking loops.

Thus it will be appreciated from the above that as a result of the present invention, a highly effective whisk structure is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A whisk structure, comprising:
   a handle having, at one end thereof, a counterbore defined by an internal wall surface formed at a first radius and a plurality of first-diameter bores located along a second radius, the second radius exceeding the first radius by a dimension no larger than the radius of the first-diameter bores;
   a plurality of whisking elements each having an end portion received within a respective first-diameter bore; and
   means for releasably securing said whisking element end portions in their respective first-diameter bores including a securing disc received with the counterbore to forcibly retained the whisking element end portions in their respective bores and a fastener means for maintaining said securing disc in the counterbore.

* * * * *